United States Patent [19]

Jefferies

[11] 4,437,630

[45] Mar. 20, 1984

[54] SPRAY BOOM APPARATUS FOR APPLYING CHEMICAL DISPERSANTS TO OCEAN OIL SPILLS

[75] Inventor: James C. Jefferies, Chandler, Ariz.

[73] Assignee: Biegert Aviation, Inc., Chandler, Ariz.

[21] Appl. No.: 300,260

[22] Filed: Sep. 8, 1981

[51] Int. Cl.³ .............................................. B64D 1/18
[52] U.S. Cl. ..................................... 244/136; 239/171
[58] Field of Search ................ 244/136, 129.5, 137 R; 239/159, 160, 161, 163, 164, 165, 166, 167, 171, 176; 169/53

[56] References Cited

U.S. PATENT DOCUMENTS 2,659,624 11/1953 Harz ..................................... 239/164
4,195,693 4/1980 Busch et al. .......................... 169/53

FOREIGN PATENT DOCUMENTS 520137 5/1976 U.S.S.R. .............................. 239/171

Primary Examiner—Galen L. Barefoot
Assistant Examiner—Rodney Corl
Attorney, Agent, or Firm—Drummond & Nissle

[57] ABSTRACT

A self-contained spraying boom apparatus for in-flight adaptation of the aircraft for aerial swath spraying.

1 Claim, 9 Drawing Figures

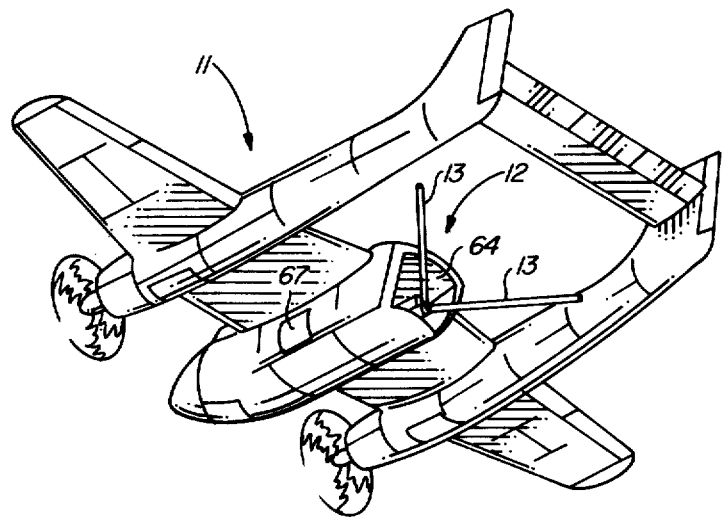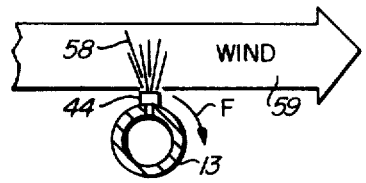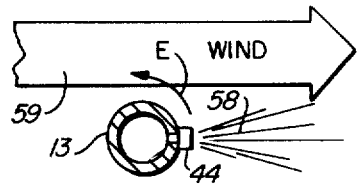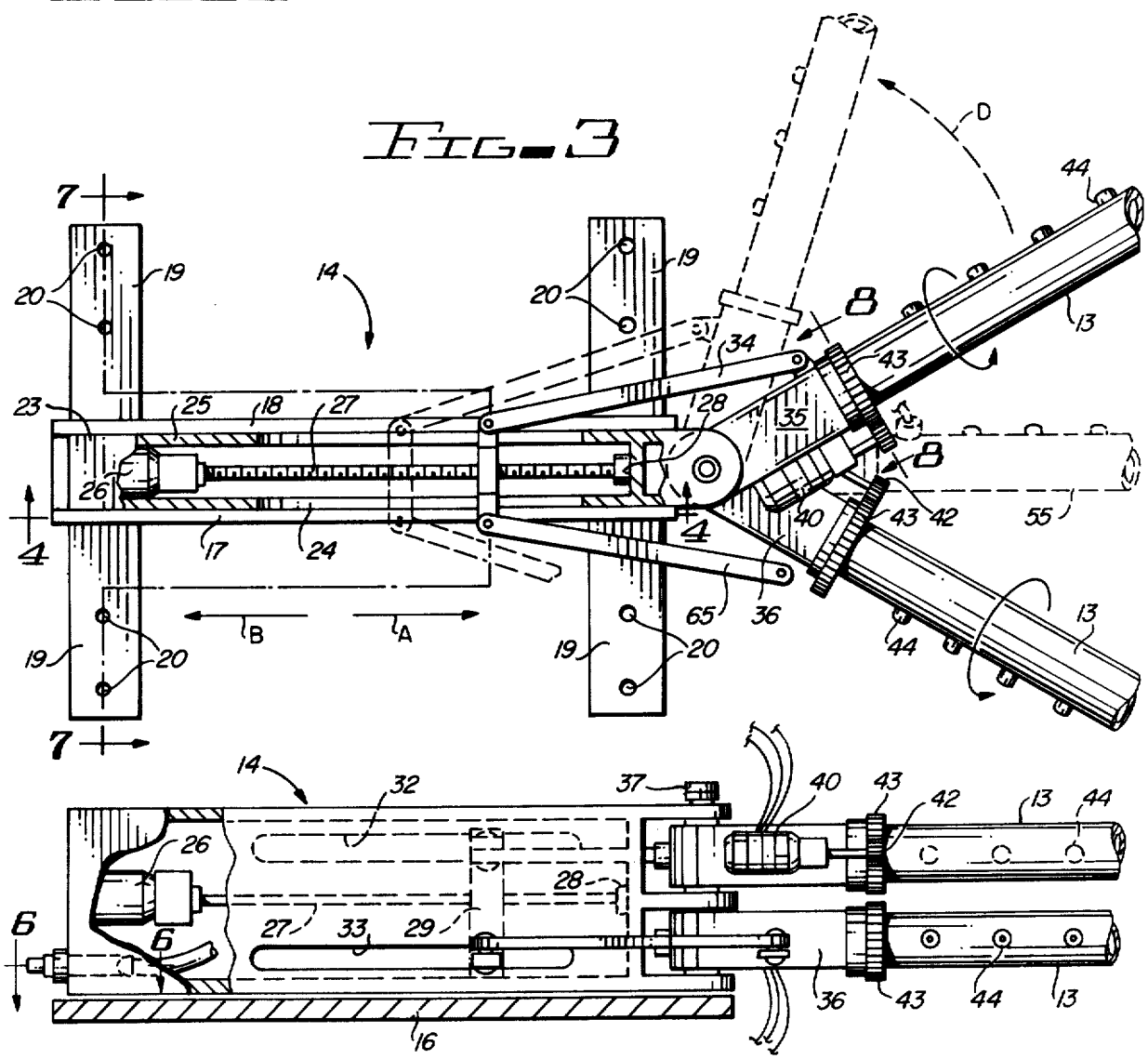

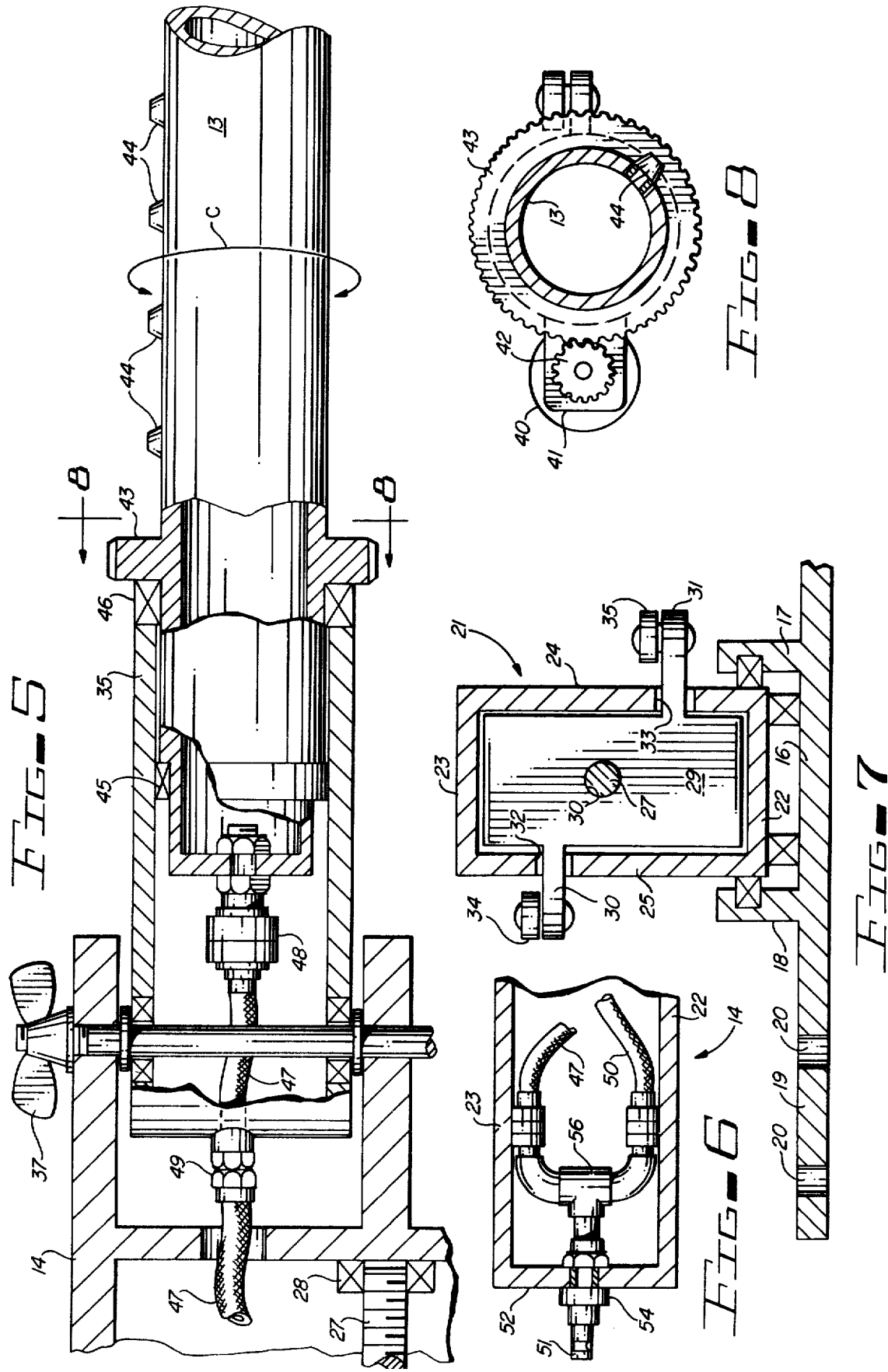

SPRAY BOOM APPARATUS FOR APPLYING CHEMICAL DISPERSANTS TO OCEAN OIL SPILLS

This invention relates to aerial spraying apparatus.

More particularly, the invention concerns aerial spraying apparatus which facilitates the application of fluid oil-dispersant chemicals to ocean oil spills.

In a further and more specific respect, the invention concerns a self-contained spraying boom apparatus which permits the in-flight adaptation of transport aircraft for aerial spraying.

In another aspect, the invention relates to a self-contained spraying boom apparatus which can be readily installed in the hold of an existing transport aircraft without having to structurally modify the aircraft and which can be quickly removed from the aircraft and installed in other existing transport aircraft.

In a further aspect, the invention pertains to a spraying boom system which permits a spraying boom to be extended from the cargo hold of a transport plane to a position outside of the plane's fuselage when the aircraft is flying over the designated spraying area so that additional aerodynamic drag which would be caused by having the boom extended during flight to and from the spraying area is eliminated.

BACKGROUND OF THE INVENTION

The use of aircraft in agrichemical spraying is well known. The aircraft or "crop dusters" utilized in applying pesticidal, herbicidal or fertilizing agents to crops are usually small single engine propeller driven airplanes or helicopters which are equipped with "bird cages" or spray booms comprised of pipes provided with spaced spray nozzles along their lengths. The spray booms are attached to and carried on the exterior surfaces of the wings or fuselage of the aircraft, usually until the aircraft literally falls apart from the corrosion caused by the chemicals applied by the crop duster. Crop dusters have a relatively short flying range and are normally used to spray crops located near the airfield at which each particular airplane is based.

The substantial number of ocean-going tankers which transport petroleum from the Middle East and other oil producing countries to the United States has increased the likelihood of large oil spills which occur when such vessels are damaged, run aground, or sink at sea. Since the damages, and consequently the liability, which result when large oil spills float ashore can be extensive, a substantial amount of research has been performed on methods for controlling and dispersing oil spills. In one proposed method, an oil spill is surrounded with a collar which floats on the ocean surface and prevents the oil spill from breaking into a number of discrete smaller segments. While the collar is in place, a surface ship vacuums oil from the surface of the ocean. This process has several distinct disadvantages. During inclement or windy weather the collar will not effectively contain the surface oil and the procedure for vacuuming oil from the surface of the water is expensive and time consuming. Further, after the oil is removed from the water, it must be transported to a processing site for reclamation and storage.

Another proposed method which has been considered for controlling and dissipating oil spills comprises applying a chemical to the oil spill which causes the oil to disassociate into small droplets which readily disperse over the surface of and are absorbed by the ocean. This type of procedure is desirable because once the dispersant chemicals are applied, auxiliary equipment is not required to remove and transport the oil to another location for reclamation and storage. However, conventional spray planes do not have the range or load-carrying capacity to make the application of dispersant chemicals over large areas of ocean feasible. Similarly, converting a large cargo airplane into a spray plane by attaching conventional spray booms to the wings or external fuselage of the aircraft is not desirable because of the cost and time entailed in properly outfitting the plane and because the cargo plane would only be required for spraying during relatively short periods of time. Once a spraying mission was completed at least part of the spraying equipment would probably have to be dismantled and removed from the aircraft in order to once again be able to utilize the plane to haul cargo. In particular, if the spray booms and nozzles were not removed from the wings and fuselage, the increased aerodynamic drag caused by the booms would measurably reduce the range of the plane.

Another problem associated with aerial spraying is that droplets of dispersant chemicals dispensed by an aircraft can be carried far away from the area of the oil slick by ocean winds which may arise or exist at any time during a spraying operation.

Accordingly, it would be highly desirable to provide auxiliary spraying boom apparatus which could be used to equip existing transport planes for aerial spraying without having to structurally modify the aircraft.

It would also be highly desirable to provide aerial spraying boom apparatus which could be readily installed in a variety of existing cargo planes and could be adjusted during flight to compensate for changes in wind and other weather conditions.

Therefore, it is the principal object of the invention to provide improved aerial spraying boom apparatus for dispensing dispersant chemicals on ocean oil spills.

Another object of the present invention is to provide improved aerial spraying boom apparatus which can be installed in the hold of an existing cargo plane without having to structurally modify the aircraft.

A further object of the invention is to provide improved aerial spraying boom apparatus which permits a transport plane to be modified for aerial spraying while airborne.

Still another object of the invention is to provide improved aerial spraying boom apparatus which can be easily and conveniently transferred from one aircraft to another.

Yet another object of the invention is to provide improved aerial spraying boom apparatus in which the size of fluid droplets dispensed by the apparatus can be varied while the aircraft is airborne in order to compensate for changes in wind and weather conditions to ensure that spray droplets dispensed by the apparatus contact oil floating on the ocean's surface.

BRIEF DESCRIPTION OF THE DRAWINGS

These and other, further and more specific objects and advantages of the invention will be apparent to those skilled in the art from the following detailed description thereof, taken in conjunction with the drawings, in which:

FIG. 1 is a perspective view illustrating a transport aircraft provided with an aerial spraying boom constructed in accordance with the principles of the invention;

FIG. 2A is a side sectional view of a spray boom and attached nozzle illustrating the relation thereof to the apparent wind;

FIG. 2B is a side sectional view of a spray boom nozzle illustrating the effect of nozzle position in determining the droplet particle size which results from the interaction of the apparent wind and spray dispensed from the nozzle;

FIG. 3 is a top view of the presently preferred embodiment of the invention;

FIG. 4 is a side sectional view of the aerial spray boom apparatus of FIG. 3 taken along section line 4—4 thereof and illustrating further construction details thereof;

FIG. 5 is an enlarged side view of one of the spray booms of FIG. 4 having a portion thereof broken away to illustrate interior construction details thereof;

FIG. 6 is a sectional view of a portion of the aerial spraying apparatus of FIG. 4 taken along section line 6—6 thereof;

FIG. 7 is a sectional view of a portion of the gearing of the aerial spraying boom apparatus of FIG. 3 taken along section line 7—7 thereof; and FIG. 8 is a sectional view of a portion of the gearing used to rotate one of the booms of the aerial spraying boom apparatus of FIG. 3 taken along section line 8—8 thereof.

SUMMARY OF THE INVENTION

Briefly, in accordance with my invention, I provide a substantially self-contained spraying boom apparatus for the in-flight adaptation of a transport aircraft for aerial swath spraying. The aircraft includes a fuselage, a hold formed within the fuselage for receiving and carrying cargo during the flight of the aircraft, and an entranceway formed in the wall of the fuselage for loading and unloading cargo into and from the hold. The spraying boom apparatus is readily installed in the hold of the aircraft generally without structural modification of the aircraft, permits the aircraft to be modified for aerial spraying while airborne, and is readily removed from the aircraft and installed in other existing transport aircraft. The boom apparatus includes a support frame; at least one elongate substantially rigid spray boom carried by the support frame and having a fluid conduit, and a plurality of fluid dispensing apertures in fluid communication with the conduit and each shaped, contoured and dimensioned to spray fluid into the air; anchoring means for fixedly detachably securing the support frame to the interior of the hold of the aircraft; connector means for attaching a source of fluid to said conduit such that fluid from the source can flow into and through the conduit and be discharged through the spray apertures into the air; and means carried by the frame for moving the substantially rigid spray boom between at least two operative positions, a storage position and an extended spraying position with the boom positioned outside of the fuselage and with the elongate axis of the boom at an angle with respect to the line of travel of the aircraft such that spray dispensed by the apertures of the boom initially forms a generally elongate planar swath, the elongate axis of the swath being parallel to the line of travel of the aircraft. When the boom is in the extended spraying position, a portion of the support frame connected to the boom extends therefrom through the entranceway and into the hold of the aircraft.

Turning now to the drawings, which depict the presently preferred embodiments of the invention for the purpose of illustrating the practice thereof and not by way of limitation of the scope of the invention, and in which identical reference characters represent corresponding elements throughout the several views:

FIG. 1 illustrates a transport aircraft 11 provided with spray boom apparatus 12 constructed in accordance with the invention and including a pair of extended spray booms 13. As shown in FIGS. 3-8, aerial spraying apparatus 12 includes a support frame 14 including an elongate, generally U-shaped housing havng a base 16 provided with a pair of parallel, opposed upstanding walls 17, 18. Rectangular feet 19 are attached to base 16 and provided with apertures 20 for fixedly, detachably securing feet 19 to the floor of the cargo hold of a transport aircraft. Support frame 14 may be constructed in a variety of embodiments which would facilitate fixedly, detachably securing the frame to the interior of the cargo hold utilizing provisions existing on the aircraft for restraining the movement of cargo in the hold and which would minimize or eliminate the necessity for structurally modifying the aircraft to receive the spray boom apparatus. The U-shaped housing slidably receives an elongate rectangular arm 21 having floor panel 22, ceiling panel 23 and side walls 24, 25. Reversible motor 26 mounted inside of arm 21 turns drive screw 27. One end of drive screw 27 is received by and turned by motor 26 while the opposite end of drive screw 27 is rotatably carried by bushing 28. Rectangular panel member 29 is provided with internally threaded aperture 30 which engages drive screw 27 such that when motor 26 rotates screw 27 in one direction plate 29 is displaced in the direction of arrow A in FIG. 3. When the motor 26 rotates screw 27 in the opposite direction, plate 29 is displaced in the direction of arrow B. While plate 29 moves along the interior of arm 14, perpendicular depending arms 30, 31 of plate 29 respectively project through and move along elongate slots 32, 33 respectively formed in walls 25, 24. Elongate links 34, 65 are respectively pivotally connected at one end to arms 30, 31 and at their other end to collars 35, 36 rotatably supporting booms 13. Connecting pin 37 pivotally secured collars 35, 36 to arm 14. Quick release connectors are used to pivotally attach links 34 and 65 to collars 35, 36 and pin 37 is a quick release connector so that booms 13 may be easily removed from arm 14.

Motors 40 mounted on collars 35, 36 provide motive power to gear boxes 41 and, consequently, to toothed gears 42 which engage gears 43 fixedly secured to booms 13. Reversible motors 40 can rotate booms 13 and fluid dispensing spray nozzles 44 carried by boom 13 in the directions indicated by arrow C in FIG. 5. Bearings 45, 46 allow booms 13 to freely rotate in collars 35, 36 and flexible conduit 47 delivering chemical dispersants to boom 13 for dispensing through spray nozzles 44 is provided with a swivel connector 48 which prevents conduit 47 from twisting when boom 31 is rotated. Quick release connectors 49 and quick release pin 37 permit booms 13 to be quickly detached from arm 14.

As shown in FIG. 6, line 51 from a fluid supply source is attached to wall 52 of arm 14 with quick release fitting 54.

DESCRIPTION OF THE PREFERRED EMBODIMENTS

Fluid from line 51 flows through T-fitting 56 and flexible conduits 47, 50 to booms 13. Fluid or slurry entering booms 13 is dispensed through nozzles 44 as a spray.

In use, the aerial spraying boom apparatus of FIGS. 3–8 is loaded into the hold of an aircraft and fixedly, detachably secured to the floor of the hold, preferably by utilizing existing fittings in the aircraft. Although this is normally accomplished before the aircraft becomes airborne, it is anticipated that the aerial spraying boom apparatus will be of compact and lightweight construction so that it may actually be positioned in and/or assembled in the hold while the plane is in flight. To facilitate the handling and storage of the apparatus, booms 13 may telescope, may each be comprised of several sections which are quickly connected and disconnected from one another, or may be comprised of several sections which are pivotally connected to one another so the boom can be folded into a short, compact length.

Once transport airplane 11 reaches or is near the site of an ocean oil spill, the rear cargo door of the plane is lowered and arm 14 is actuated, either mechanically or manually, so that it slides in the direction indicated by arrow A in FIG. 3 and extends booms 13 from the aircraft hold through the cargo door to a position on the exterior of the aircraft fuselage. While booms 13 are being extended from the aircraft, they are in the position indicated by dashed lines 55 in FIG. 3 and are essentially co-linear with the elongate axis of arm 14 and drive screw 27. After booms 13 are extended to their desired position, motor 26 is actuated to turn drive screw 27 so that plate 29 is displaced in the direction indicated by arrow B in FIG. 3 and booms 13 are rotated about pin 37 to spraying positions similar to those seen in FIG. 1. While plate 29 is displaced in the direction indicated by arrow B, boom 13 carried by collar 35 rotates in the direction of arrow D.

When booms 13 telescope, they only occupy a relatively small space when collapsed, and simply extending the booms to their full length after lowering the cargo door of plane 11 in flight could place booms 13 in the "V-position" used for aerial swath spraying. This would eliminate the need for arm 14, motor 26, drive screw 27 and the other apparatus utilized to extend booms 13 along the longitudinal axis of the hold of aircraft 11, i.e., to extend booms 13 in the direction indicated by arrow A in FIG. 3. If telescoping booms were used in this manner, portions of the booms near the fuselage of the aircraft might not be equipped with spray nozzles and would actually function as part of the framework supporting the spraying section of the boom. Telescoping booms would facilitate the extension of spraying booms through cargo doors 67 formed along the sides of the fuselage of plane 11.

After booms 13 are positioned as illustrated in FIG. 1, motors 40 are actuated to rotate nozzles 44 to the desired position. When nozzles 44 point straight up (or down) as depicted in FIG. 2A, the apparent wind, i.e., the "wind" caused by the forward motion of plane 11 through the air, shears through and further breaks up droplets contained in spray 58 dispensed by nozzles 44. When nozzles 44 are oriented as shown in FIG. 2B so that spray flows from the nozzles in a direction essentially parallel to the direction of the apparent wind, this shearing effect is minimized. Thus, during flight, the size of fluid droplets contained in spray 58 can be progressively reduced by simply rotating nozzles 44 from the position shown in FIG. 2B in the direction indicated by arrow E. The ability to vary the droplet size contained in spray 28 while in flight can be crucial because wind speed or humidity conditions can rapidly change while chemical dispersants are being applied to an oil slick. If the droplet size is too small, when actual wind speeds increase the wind may carry dispensed spray away from the area of the oil slick or from an area of land being sprayed. With the apparatus illustrated in FIGS. 2–8, an increase in wind speed can be at least partially offset by simply rotating nozzles 44 in the direction indicated by arrow F in FIG. 2A and toward the position of nozzle 44 shown in FIG. 2B. Nozzles 44 may also be equipped with means for altering the size or shape of spray apertures formed therein while in flight.

Although aircraft 11 could become airborne with cargo door 64 open and booms 13 partially or completely extended through door 64 to a position on the exterior of plane 11, it is preferred that the aerial spraying apparatus be completely stored in the hold of plane 11 until the designated spraying area is reached. In the presently preferred embodiment of the invention, each boom 13 is approximately thirty feet long.

Having described my invention in such terms as to enable those skilled in the art to understand and practice it, and having identified the presently preferred embodiments thereof, I claim:

1. In combination with a transport aircraft, said aircraft including
    a fuselage having an exterior aerodynamic surface,
    wings attached to the fuselage,
    a hold formed within the fuselage for receiving and carrying cargo during flight of said aircraft, and
    an entranceway formed in the fuselage for loading and unloading cargo into and from the hold,
boom and nozzle spray apparatus for in-flight adaptation of the aircraft for aerial swath spraying, said boom and nozzle apparatus generally
    permitting said aircraft to be modified for aerial spraying by extending a spray boom while in flight over a designated spraying area so that aerodynamic drag which would be caused by having the boom extended during flight to and from the designated spraying area is eliminated,
    eliminating having to structurally modify the aircraft during installation of said boom and nozzle apparatus,
    being quickly and conveniently installed in said cargo hold so the aircraft can be rapidly fitted with said apparatus and take flight,
    being readily removed from the aircraft after installation therein and installed in a second transport aircraft, and
    reducing corrosion of the wings and fuselage of the aircraft which occurs when corrosive chemicals are dispensed by said apparatus,
and including
    (a) a support frame,
    (b) an elongate substantially rigid spray boom carried by said support frame and having
        (i) a fluid conduit,
        (ii) a plurality of fluid dispensing apertures spaced along said spray boom in fluid communication with said conduit and each shaped, contoured and dimensioned to spray fluid into the air, and (iii) an imaginary longitudinal axis,
(d) anchoring means for fixedly detachably securing said support frame in said cargo hold of the aircraft, said anchoring means generally being utilized in combination with cargo securing means normally provided with the aircraft in said cargo hold such that structural modification of the aircraft is avoided during installation of said boom and spray apparatus in said cargo hold,
(d) connector means for attaching a source of fluid carried on said aircraft to said conduit such that fluid from said source can flow into and through said conduit when desired and be discharged through said apertures in said spray boom,
(e) means carried by said frame for moving said spray boom between at least two operative positions after said frame anchoring means has been utilized in combination with said cargo securing means to make fast said frame in said cargo hold,
  (i) a first operative position with said boom stored in said cargo hold, and
  (ii) a second operative position with said boom positioned outside of and spaced away and laterally from said fuselage with said imaginary longitudinal axis of said boom at an angle with respect to the direction of travel of the aircraft when airborne such that spray dispensed through said apertures of said boom forms a generally elongate planar swath having an imaginary longitudinal axis generally parallel to said direction of travel of the aircraft, a portion of said frame extending from said hold through said entranceway to support said boom in said second operative position.

* * * * *